United States Patent
LoRe et al.

(10) Patent No.: US 10,380,528 B2
(45) Date of Patent: Aug. 13, 2019

(54) INTERACTIVE APPROACH FOR MANAGING RISK AND TRANSPARENCY

(71) Applicant: JPMorgan Chase Bank, N.A., New York, NY (US)

(72) Inventors: Nicholas LoRe, New York, NY (US); Benjamin Sokol, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 747 days.

(21) Appl. No.: 14/837,582

(22) Filed: Aug. 27, 2015

(65) Prior Publication Data
US 2017/0061342 A1 Mar. 2, 2017

(51) Int. Cl.
*G06Q 10/06* (2012.01)

(52) U.S. Cl.
CPC ... *G06Q 10/0635* (2013.01); *G06Q 10/06393* (2013.01); *G06Q 10/063114* (2013.01)

(58) Field of Classification Search
CPC ......... G06Q 10/00; G06Q 10/06; G06F 17/60
USPC ...................................................... 705/7.15
See application file for complete search history.

(56) References Cited

U.S. PATENT DOCUMENTS

| | | | |
|---|---|---|---|
| 7,313,531 B2 * | 12/2007 | Chappel | G06Q 10/06 705/7.17 |
| 7,483,841 B1 * | 1/2009 | Jin | G06Q 10/06 705/7.11 |
| 7,801,809 B1 * | 9/2010 | Hunter | G06Q 40/00 705/38 |
| 8,195,492 B2 * | 6/2012 | Barker | G06Q 10/063 705/7.11 |
| 8,370,192 B2 * | 2/2013 | Deo | G06Q 10/06 705/7.36 |
| 8,407,078 B1 * | 3/2013 | Caputo | G06Q 10/06 705/7.27 |
| 9,870,546 B1 * | 1/2018 | Reynolds | G06Q 10/0635 |
| 2002/0198750 A1 * | 12/2002 | Innes | G06Q 10/0635 705/7.28 |
| 2005/0171963 A1 * | 8/2005 | Barrett | G06Q 10/06 |
| 2007/0186187 A1 * | 8/2007 | Strope | G06F 3/0481 715/833 |
| 2008/0077530 A1 * | 3/2008 | Banas | G06Q 10/06 705/50 |
| 2008/0312979 A1 * | 12/2008 | Lee | G06Q 10/06311 705/7.28 |

(Continued)

*Primary Examiner* — Romain Jeanty
(74) *Attorney, Agent, or Firm* — Greenblum & Bernstein, P.L.C.

(57) ABSTRACT

A network interface accesses project data, wherein the project data comprises a metric for a project. A processor determines a project completeness based on the project data. The network interface receives a project assessment and also accesses updated project data, wherein the updated project data comprises an updated metric for the project. The processor then determines an updated completeness of the project, and determines a change in the completeness of the project. When the change in the completeness of the project is over a threshold, the processor sets a material change flag. The processor also determines a low-granularity project status. The processor then generates a project heat map. The project heat map is displayed in a tabular format. The project heat map presents the completeness of the project, material change flag, and the low-granularity project status for the project simultaneously.

20 Claims, 3 Drawing Sheets

(56) References Cited

U.S. PATENT DOCUMENTS

| | | | | |
|---|---|---|---|---|
| 2010/0082386 A1* | 4/2010 | Cao | ............... | G06Q 10/06 |
| | | | | 705/7.39 |
| 2012/0130907 A1* | 5/2012 | Thompson | ............ | G06Q 10/103 |
| | | | | 705/301 |
| 2014/0032255 A1* | 1/2014 | Hegazi | ............ | G06Q 10/04 |
| | | | | 705/7.22 |
| 2014/0136294 A1* | 5/2014 | Martinovic | ...... | G06Q 10/06375 |
| | | | | 705/7.37 |

* cited by examiner

INTERACTIVE APPROACH FOR MANAGING RISK AND TRANSPARENCY

TECHNICAL FIELD

This invention relates generally to generating a display containing metrics regarding a project, and more particularly to generating a project heat map that contains visual representations of metrics regarding a project.

BACKGROUND OF THE INVENTION

An organization may view metrics related to a project. These metrics provide a snapshot of the current status of the project. However, looking at the metric (i.e., the snapshot of the project) alone fails to provide an overall picture of the well-being of the project. Furthermore, when dealing with multiple projects, analyzing the metric for each project becomes time consuming.

In addition, members of the organization may communicate messages regarding the project to other members over traditional methods of communication, such as electronic mail. Members that are not part of that communication may never receive the message communicated regarding the project. Furthermore, because the messages are not cataloged with the specific project, other members may not be able to easily access and respond to the messages.

SUMMARY OF EXAMPLE EMBODIMENTS

According to embodiments of the present disclosure, disadvantages and problems associated with generating a project heat map may be reduced or eliminated.

In certain embodiments, a network interface accesses project data associated with a project, wherein the project data comprises a metric for the project. A processor determines a completeness of the project based on the project data. The network interface receives a project assessment associated with the project and also accesses updated project data, wherein the updated project data comprises an updated metric for the project. The processor then determines an updated completeness of the project based on the updated project data, and determines a change in the completeness of the project based on the completeness of the project and the updated completeness of the project. When the change in the completeness of the project is over a threshold, the processor sets a material change flag for the project. The processor also determines a low-granularity project status for the project based on the received project assessment associated with the project. The low-granularity project status indicates a status summary of the project. The processor then generates a project heat map. The project heat map is displayed in a tabular format. The project heat map presents the completeness of the project, material change flag, and the low-granularity project status for the project simultaneously.

Certain embodiments of the present disclosure may provide one or more technical advantages. A technical advantage of one embodiment includes providing a graphical display that allows a user to quickly assess a project's well-being. Yet another technical advantage includes instantaneously updating a generated project heat map using updated information, thus providing a user a real-time view into the project's metrics. Another technical advantage includes improving the efficiency of network resource usage by accumulating a project's metrics into one module. An additional technical advantage includes improving visibility into a company's projects by presenting the project's metrics using a graphical representation. Additionally, a technical advantage of one embodiment includes increasing transparency o various management styles and project concerns across different levels of management. Furthermore, by generating a project heat map in a centralized location, an organization may further experience efficiency in other resources, such as computing resources.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION

Figure 1:
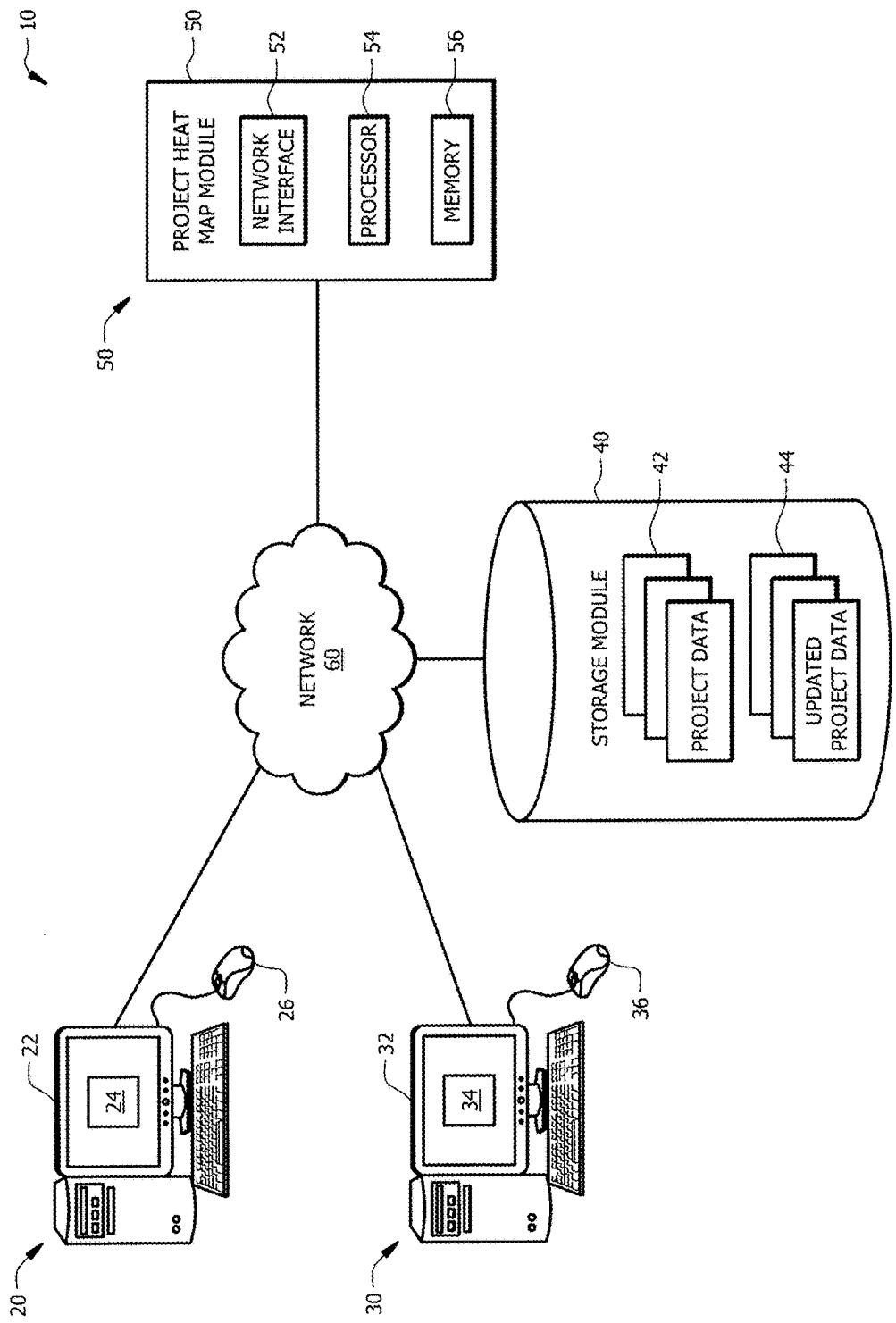
FIG. 1 illustrates an example system for generating a project heat map, according to certain embodiments of the present disclosure.
Figure 2:
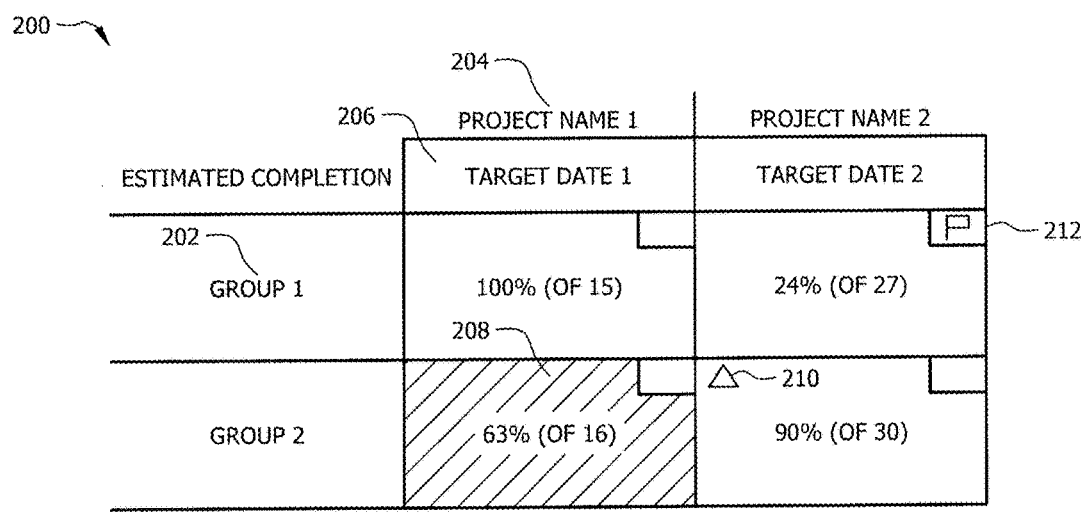
FIG. 2 illustrates an example project heat map, according to certain embodiments of the present disclosure.
Figure 3:
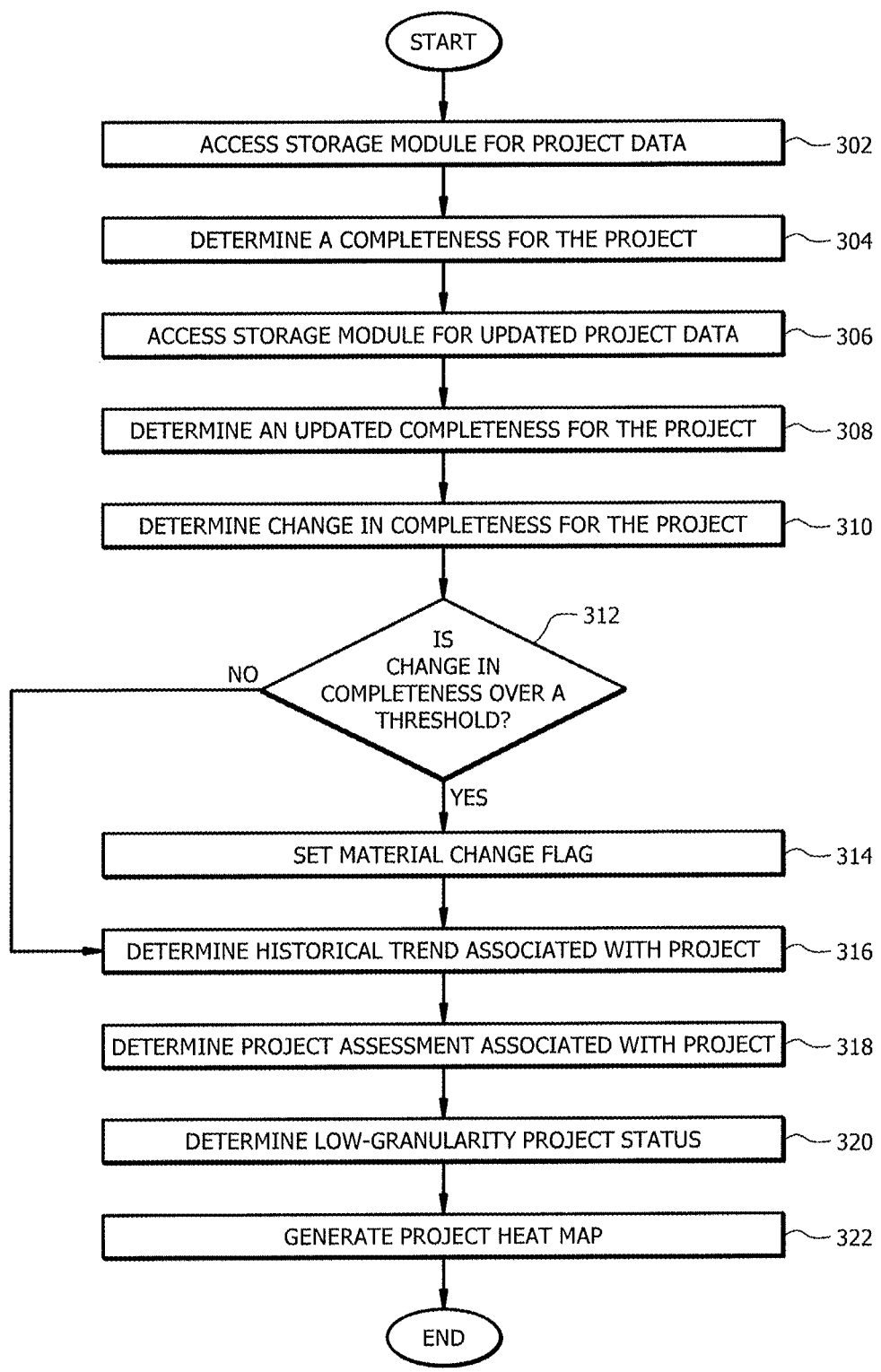
FIG. 3 illustrates an example method for generating a project heat map, according to certain embodiments of the present disclosure.

Embodiments of the present invention and its advantages are best understood by referring to FIGS. 1 through 3 of the drawings, like numerals being used for like and corresponding parts of the various drawings.

An organization may view metrics related to a project. These metrics provide a snapshot of the current status of the project. However, looking at the metrics (i.e., the snapshot of the project) alone fails to provide an overall picture of the well-being of the project. Furthermore, when dealing with multiple projects, analyzing the metrics for each project becomes time consuming.

In addition, members of the organization may communicate messages regarding the project to other members over traditional methods of communication, such as electronic mail. Members that are not part of that communication may never receive messages communicated regarding the project. Furthermore, because the messages are not cataloged with the specific project, other members may not be able to easily access and respond to the messages.

Therefore, it is advantageous to provide a system and method to generate a project heat map. A system accesses project data and updated project data, and then analyzes the project data and updated project data to generate a project heat map. The project heat map may indicate the updated completeness of the project, material change flag, and a low-granularity project status for the project simultaneously. A user viewing the project heat map may then be able to quickly identify projects that may appear off-track. In addition, the user may delve into further metrics about the project by interacting with the project heat map and also communicate/view messages associated with the project.

FIG. 1 illustrates a block diagram of an embodiment of a system 10 for generating a project heat map. System 10 includes one or more user computer systems 20, one or more project manager computer systems 30, one or more storage modules 40, and project heat map module 50 to facilitate generating a project heat map for one or more projects. User computer systems 20, project manager computer systems 30, storage modules 40, and project heat map module 50 may communicate over one or more networks 60.

Using project heat map module 50, a user or project manager may be able to quickly and effectively identify the status of a project. In addition to being able to view the current metrics associated with a project by interacting with the generated project heat map, the project heat map provides a graphic displaying potential problem areas with a project by using past project data. In doing so, a user may quickly assess and identify problem areas within a myriad of projects using the project heat map. Furthermore, using previous metrics associated with a project, project heat map module 50 may identify any concerns, trends, or changes that may require attention. Project heat map module 50 also may be used to provide a central repository and an alert system for communication regarding a project. Because project heat map module 50 categorizes messages according to the project, the central repository may be accessible to determine a complete line of messages regarding a project, including identifying the most current messages.

System 10 includes user computer system 20. User computer system 20 may interact with project heat map module 50 to display a generated project heat map. In addition, user computer system 20 may communicate messages and/or receive notifications from project heat map module 50. User computer system 20 may also interact with project heat map module 50 to receive additional metrics and/or information regarding a project from project heat map module 50.

User computer system 20 may be implemented using any suitable type of processing system and may include any suitable combination of hardware, firmware, and software. User computer system 20 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device capable of receiving, processing, storing, and/or communicating information with other components of system 10. User computer system 20 may be a stand-alone computer or may be part of a larger network of computers associated with an entity.

User computer system 20 may include user display 22, which may include any suitable device operable to visually present information to a user. User display 22 may present a graphical user interface ("GUI") 24, which may comprise a visual interface operable to allow a user to interface with user computer system 20. Generally, GUI 24 provides the user with an efficient and user-friendly presentation of data provided by system 10, such as charts, tables and other information. GUI 24 may comprise a plurality of displays having interactive fields, pull-down lists, and buttons operated by the user. In one example, GUI 24 presents multiple charts and tables according to specification by the user and receives commands from the user. Further, GUI 24 contemplates any graphical user interface, such as a generic web browser, that processes information in system 10 and efficiently presents the information to the user. User computer system 20 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

User computer system 20 may include input device 26. Input device 26 allows a user to interact with project heat map module 50 through user computer system 20. Input device 26 may comprise any user interface, such as a display, keyboard, mouse, or other appropriate terminal equipment.

User computer system 20 may interact with project heat map module 50 to generate a project heat map. For example, user computer system 20 communicates with project heat map module 50 to display a generated project heat map on GUI 24. As another example, user computer system 20 communicates messages associated with a project to project heat map module 50. As yet another example, user computer system 20 communicates with project heat map module 50 to establish preferences to set thresholds for various metrics and flags, such as a threshold, material change flag, low-granularity project status, and/or risk status. A user may view and otherwise interact with the generated project heat map using computer system 12. Users may represent any individual in an organization, such as an employee, a manager, or an executive manager.

Project manager computer system 30 may be implemented using any suitable type of processing system and may include any suitable combination of hardware, firmware, and software. Project manager computer system 30 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, smart phones, table computers, one or more servers, a server pool, one or more processors within these or other devices, or any other suitable processing device capable of receiving, processing, storing, and/or communicating information with other components of system 10. Project manager computer system 30 may be a stand-alone computer or may be part of a larger network of computers associated with an entity.

Project manager computer system 30 may include project manager display 32, which may include any suitable device operable to visually present information to a user. Project manager display 32 may present GUI 34, which may comprise a visual interface operable to allow a user to interface with project manager computer system 30. Generally, GUI 34 provides the project manager with an efficient and user-friendly presentation of data provided by system 10, such as charts, tables and other information. GUI 34 may comprise a plurality of displays having interactive fields, pull-down lists, and buttons operated by the project manager. In one example, GUI 34 presents multiple charts and tables according to specification by the project manager and receives commands from the project manager. It should be understood that the term graphical user interface may be used in the singular or in the plural to describe one or more graphical user interfaces and each of the displays of a particular graphical user interface. Further, GUI 34 contemplates any graphical user interface, such as a generic web browser, that processes information in system 10 and efficiently presents the information to the user. Project manager computer system 30 can accept data from the project manager via the web browser (e.g., MICROSOFT INTERNET EXPLORER, GOOGLE CHROME, or MOZILLA FIREFOX) and return the appropriate HTML or eXtensible Markup Language (XML) responses.

Project manager computer system 30 may include input device 36. Input device 36 allows a project manager to interact with project heat map module 50 through project manager computer system 20. Input device 36 may comprise any user interface, such as a display, keyboard, mouse, or other appropriate terminal equipment.

Project manager computer system 30 may interact with project heat map module 50. For example, project manager computer system 30 may communicate project data 42 and/or updated project data 44 to project heat map module 50 via storage module 40. As another example, project manager computer system 30 communicates messages associated with a project to project heat map module 50. As an additional example, project manager computer system 30 may communicate key metrics to project heat map module 50. Project heat map module 50 may then use the key metrics to alter the generated project heat map or communicate metrics to user computer system 20. A project manager may view and otherwise interact with a displayed visual planner using project manager system 30. Typically, a user for project manager computer system 30 is a project manager or employee associated with one or more projects.

As described above, system 10 may include storage module 40, which may store project data 42 and updated project data 44. Storage module 40 may include any one or a combination of volatile or non-volatile local or remote devices suitable for storing information. For example, storage module 40 may include random access memory (RAM), read only memory (ROM), magnetic storage devices, optical storage devices, or any other suitable information storage device or a combination of these devices. Storage module 40 may be part of or distinct from user computer system 20, project manager computer system 30, and/or project heat map module 50. Although storage module 40 is illustrated and described as storing particular information, a portion or all of that information may be stored in memory 56 or another suitable location. In certain embodiments, storage module 40 pushes data to project heat map module 50. In other embodiments, project heat map module 50 may access storage module 40 to collect data. For example, project heat map module 50 may query storage module 40 to collect the necessary project data.

Storage module 40 may store project data 42. In certain embodiments, project data 42 may include information for use by project heat map module 50 in generating a project heat map. For example, project data 42 may include information related to the one or more projects underlying the project heat map generated by project heat map module 50. As a more particular example, project data 42 may include information regarding a metric related to a project. A metric may be any type of trackable data, status, financial information, resources, or information related to a project. Example metrics include budgets, timelines, project deliverables, or any other type of benchmark for a particular project. In certain embodiments, project data 42 comprises information related to a project for the current cycle and information related to a project for past cycles. For example, project data 42 may comprise information about a project for this quarter and may also provide historical data for the project from previous quarters. In these situations, projects may exist that are reoccurring; for example, a project may occur every quarter or every year In these scenarios, project heat map module 50 may continuously accumulate project data 42 such that project heat map module 50 has collected project data 42 for the current iteration of the project and past iterations of the project. Project data 42 typically comprises metrics related to a project.

Storage module 40 may also store updated project data 44. Updated project data 44 typically contains updated information for a project that is associated with project data 42. In an embodiment, project heat map module 50 accesses project data 42 first and, at a later time, accesses updated project data 44 to receive updated information regarding a project. Similar to project data 42, updated project data 44 may include information related to the one or more projects underlying the project heat map generated by project heat map module 50. Updated project data 44 may comprise metrics related to a project.

As project heat map module 50 continuously accesses storage module 40 for project data 42 and/or updated project data 44, project heat map module 50 develops a historical account of a project. In certain embodiments, project heat map module 50 stores information related to multiple cycles of a project. For example, for a project that occurs quarterly, project heat map module 50 may collect information quarterly for that particular project. Project heat map module 50 may also provide statistical analysis on previous cycles of a project to develop a historical trend. Using the historical trend, project heat map module 50 may forecast where a particular metric should be at a particular time period. For example, if in previous years, a group manufactured 100 widgets by November of Year X, manufactured 150 widgets by November of Year X+1, and manufactured 125 widgets by November of Year X+2, project heat map module 50 may develop a historical trend indicating that the expectation is to manufacture 125 widgets by November of Year X+3. In an exemplary embodiment of operation, project heat map module 50 may use additional statistics, such as a deviation analysis, to determine a projection of the metric for a particular time period. Using the projection of the metrics and also the goal associated with the project, project heat map module 50 may determine an expected completeness for the project.

Project heat map module 50 represents any suitable component that facilitates accessing project data 42 and updated project data 44 from storage module 40 to generate a project heat map for user computer system 20 and/or project manager computer system 30. In addition, project heat map module 50 may receive, store, and associate messages from user computer system 20 with one or more projects. Similarly, project heat map module 50 may receive, store, and associate messages from project manager computer system 30 with one or more projects. Project heat map module 50 may also communicate key metrics to user computer system 20.

Project heat map module 50 may include a network server, any suitable remote server, a mainframe, a host computer, a workstation, a web server, a personal computer, a file server, or any other suitable device operable to communicate with user computer systems 20 and/or project manager computer systems 30. In some embodiments, project heat map module 50 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of project heat map module 50 may be performed by any suitable combination of one or more servers or other components at one or more locations. In the embodiment where project heat map module 50 is a server, the server may be a private server, or the server may be a virtual or physical server. The server may include one or more servers at the same or remote locations. Also, project heat map module 50 may include any suitable component that functions as a server. In the illustrated embodiment, project heat map module 50 includes a network interface 52, a processor 54, and a memory 56.

Network interface 52 represents any suitable device operable to receive information from network 60, transmit information through network 60, perform processing of information, communicate with other devices, or any combination of the preceding. For example, network interface 52 communicates the generated project heat map to user computer system 20. Network interface 52 represents any port or connection, real or virtual, including any suitable hardware and/or software, including protocol conversion and data processing capabilities, to communicate through a local area network (LAN), wide area network (WAN), or other communication system that allows project heat map module 50 to exchange information with user computer system 20, project manager computer system 30, storage module 40, network 60, or other components of system 10.

Processor 54 communicatively couples to network interface 52 and memory 56, and controls the operation and administration of project heat map module 50 by processing information received from network interface 52 and memory 56. Processor 54 includes any hardware and/or software that operates to control and process information. Processor 54 may be a programmable logic device, a microcontroller, a microprocessor, any suitable processing device, or any suitable combination of the preceding.

Memory 56 stores, either permanently or temporarily, data, operational software, or other information for processor 54. Memory 56 includes any one or a combination of volatile or non-volatile local or remote devices suitable for storing information. For example, memory 56 may include RAM, ROM, magnetic storage devices, optical storage devices, or any other suitable information storage device or a combination of these devices. Memory 56 may store project data 42, updated project data 44, and other project data accessed by heat map module 50.

In an exemplary embodiment of operation, project heat map module 50 accesses storage module 40 for project data 42. Project data 42 may include a variety of information related to a project. In certain embodiments, project heat map module 50 may continuously store project data relating to the project. In this embodiment, project heat map module 50 eventually stores both current and historical project data of a project. Storage module 40 may communicate project data 42 to project heat map module 50. In certain embodiments, storage module 40 automatically downloads project data 42 from a network drive. For example, a project manager may upload a document to a specified folder on the shared network on a weekly basis, and storage module 40 may then access the specified folder to collect the document. In certain embodiments, project heat map module 50 may determine the relevant information (such as the metric for a project) in project data 42. For example, project heat map module 50 may analyze the text in project data 42 to identify the metric of interest. In other embodiments, project heat map module 50 may run a script to identify a metric that it will collect. Although discussed as a singular metric, project data 42 may contain multiple metrics associated with a project and may contain metrics associated with various projects. In an exemplary embodiment, project heat map module 50 may analyze project data 42 to determine the type of metrics in project data 42. Project heat map module 50 may use one or more metrics in project data 42 and the project goal to determine a completeness of the project.

Project heat map module 50 may determine a completeness of the project based on project data 42. The completeness represents how close the trackable metric is to the goal of the project. The goal of a project may be inputted by a user, such as a user associated with user computer system 20 or a project manager associated with project manager computer system 30. In certain embodiments, project heat map module 50 determines a goal for the project based on historical data stored from previous iterations of the project. For example, project heat map module 50 may determine an average completeness metric per a certain time period, and then extrapolate that metric over the course of a future time period.

Project heat map module 50 may access storage module 40 at a later time for updated project data 44. Updated project data 44 comprises a metric for the project. Generally, the project in updated project data 44 is the same or a similar project to the project in project data 42. Similarly, the updated metric for the project in updated project data 44 is typically the same type of metric or a similar type of metric as the metric in project data 42. Although discussed as a singular metric, updated project data 44 may contain multiple metrics associated with a project and may contain metrics associated with multiple projects.

Similar to determining a completeness of the project based on project data 42, project heat map module 50 may determine an updated completeness of the project based on updated project data 44 and a goal. Typically, the goal of the project remains the same from project data 42 and updated project data 44. In an exemplary embodiment, the goal of the project may change from project heat map module 50 collecting project data 42 and updated project data 44. For example, a user or project manager may submit a new goal for the project.

In certain embodiments, project heat map module 50 may also associate the updated completeness of a project to a risk status. In certain instances, when generating the project heat map, project heat map module 50 may associate certain areas of the updated completeness to a risk status to display on the project heat map. For example, an updated completeness area of 80%-100% is a green status, an updated completeness range of 50% to 79% is an amber status, and an updated completeness range of 0% to 49% is a red status. In an exemplary embodiment, the percentages relating to a red-amber-green status ("RAG status") is adaptively determined. For example, the percentages may change as the project nears a deadline. Typically, if a project nears a deadline, the tolerance for near completion is lessened for a green status, whereas a range for red and amber may increase.

Next, project heat map module 50 may determine a change in the completeness of the project based on the completeness of the project and the updated completeness of the project. For example, if the team produced 20 widgets in September and 40 widgets in November, the change in the completeness of the project is 20 widgets. In certain embodiments, project heat map module 50 may standardize the change in completeness to an average over a certain period of time. For example, in the previous example, the completeness of the project may be 10 widgets per month since 20 widgets were completed over the course of two months. In exemplary embodiments, the change in the completeness of the project is weighted by the deadline. As the deadline of a project nears, project heat map module 50 may weight the change in completeness of the project differently than a project that is not nearing its deadline.

Typically, a material change indicates recent activity that occurred for a project. A user and/or project manager may use the material change to identify both active projects and also dormant projects. For example, even if a project indicates that it is 95% complete (and nearing full completion), the lack of a material change will notify the user and/or project manager that the project may be stalling.

When the change in the completeness of the project is over a threshold, project heat map module 50 sets a material change flag for the project. The threshold may be set in a myriad of ways. A user and/or project manager may preset the threshold. Project heat map module 50 may adaptively determine the threshold based statistical measurements from changes in the completeness of the project from other similar project. In certain embodiments, project heat map module 50 may determine the threshold based on previous changes in the completeness of the project during previous cycles of the project. In this embodiment, project heat map module 50 identifies an estimated change in the completeness of the project during the similar time frame, and determines a threshold from that estimated change. In certain embodiments, material change may include a variety of flags. For example, material change may include a range of changes such that different amounts of material change may be displayed as different symbols. For instance, if a change in completeness of 5% occurs, material change may be set as a minor material change. Using the same example, if a change in completeness of 50% occurs, material change may be set to a major material change. When generating the project heat map, project heat map module 50 may use different graphics and/or illustrations to reflect the different types of material change.

Project heat map module 50 may determine a low-granularity project status for the project based on a project assessment associated with the project. A low-granularity project status represents a summary of the status of the project. Instead of a project manager or user delving into the specific metrics of a project to determine the project's well-being, the low-granularity project status provides an indication of how the project is doing. In certain embodiments, the low-granularity project status may be based on a project assessment associated with the project. The low-granularity status provides an indication of a general status of the project. In certain embodiments, the low-granularity status is indicated by colors, such as a RAG status. In the RAG status, the red color generally indicates that the status is poor; the yellow color indicates that the status is mediocre; and the green color indicates that the status is okay.

The project assessment associated with a project may be a value that project heat map module 50 receives from a user associated with user computer system 20 or a project manager associated with project manager computer system 30. In certain embodiments, the user or the project manager may have the option to set the project assessment based on a personal assessment of the project. In an additional embodiment, project heat map module 50 may determine a project assessment based on metrics in project data 42 and updated project data 44. For instance, project heat map module 50 may determine a project assessment based on a key metric associated with the project data. As an example, project heat map module 50 may develop a project assessment based on the amount of funds spent for a certain project. If the amount of funds spent exceeded the allotted amount, project heat map module 50 may provide a poor project assessment. If the amount of funds spent is within the budget, project heat map module 50 may then provide a strong project assessment. An additional embodiment includes project heat map module 50 determining a project assessment using the criteria described above and a mood associated with recent messages regarding the project as described below.

In certain embodiments, project heat map module 50 may also determine the low-granularity project status for the project based on a historical trend associated with the project. Project heat map module 50 may determine a historical trend associated with the project. A historical trend consists of a trend from a previous cycle or previous cycles of a project. For example, using previous tracking data of a project's completeness over the course of a past cycle, project heat map module 50 may create an expected completeness for this current cycle. Using the historical trend, project heat map module 50 may identify a low-granularity project status for the project. In certain embodiments, project heat map module 50 may make this determination using both the project assessment associated with the project and the historical trend of the project. Project heat map module 50 may determine the low-granularity project status for the project based on a deviation from the updated completeness of the project and the expected completeness of the project. For example, using statistical analysis, project heat map module 50 may determine that the updated completion of the current status is behind the expected project completeness. Consequently, project heat map module 50 may set a red low-granularity project status for the project.

In certain embodiments, project heat map module 50 may store messages from users associated with a project. In certain embodiments, user computer systems 20 may communicate a message associated with a project to project heat map module 50. Project heat map module 50 may then store the message from the user in memory 56. In certain embodiments, project heat map module 50 may communicate the message from the user to the project manager associated with project manager computer system 30. In additional embodiments, the message or messages communicated from users in the system that are associated with a project are available by interacting with the project heat map generated by project heat map module 50.

The project manager and/or user may also communicate with project heat map module 50 to ascertain the logged message from project heat map module 50. In an exemplary embodiment of operation, project heat map module 50 determines a context of the message using contextual analysis. For example, project heat map module 50 may determine a mood of the message based on a dictionary of words associated with certain context of the text. Project heat map module 50 may then communicate the context of the message to the user or manager. In certain embodiments, project heat map module 50 includes a list of contexts defined as context of interest. Project heat map module 50 may also display the context of interest of the determined message on the generated project heat map using a context indicator. In alternative embodiments, project heat map module 50 may determine a project assessment of the project based on the context of the messages.

Project heat map module 50 may be operable to generate a project heat map for GUI 24 or GUI 34. The generated project heat map may display the updated completeness of the project, the risk status of the project, material change flag, and the low-granularity project status for the project simultaneously. In certain embodiments, each project and each metric contains a cell in a table in the generated project heat map. Within each cell, graphical indicators may display notifications on GUI 24 and/or GUI 34 to illustrate that a material change or a low-granularity project status exists for each project. For example, the low-granularity project status may be represented by a color indicating the status, such as red, amber, or green. Generally, a project manager or user will view the project heat map, and, based on the color or indicators displayed, be able to quickly identify projects that are potentially troublesome.

A user associated with user computer system 20 and/or a project manager associated with project manager computer system 30 may interact with the generated project heat map. In certain embodiments, a user and/or a manager may communicate a request for additional information regarding a particular cell in the generated project heat map. Upon receiving the request, project heat map module 50 may communicate additional metrics from updated project data 44 to the user and/or project manager. In certain embodiments, a project manager associated with project manager computer system 30 may define certain metrics as key metrics. In this embodiment, project heat map module 50 may communicate key metrics from updated project data 44 to the requesting user (e.g., user computer system 20 or project manager computer system 30).

In an exemplary embodiment, project heat map module 50 may associate key metrics for a particular user. For instance, User A may regularly click on the financials metric to view the financials of a project. User B may regularly click on headcount to view the headcount of the project. Project heat map module 50 may associate these metrics as key metrics to the individual. Accordingly, project heat map module 50 may adaptively communicate metrics associated with the user based on the user's previous interactions with project heat map module 50. Project heat map module 50 may also adaptively generate project heat map to display the key metrics associated with the viewing user. In additional embodiments, project heat map module 50 may determine the key metrics associated with a user based on the number of selections on a particular type of metric, time spent viewing a particular metric, or any other type of analysis of the user's interaction with the project heat map to the user's interest in particular metrics. In these embodiments, project heat map module 50 may distinguish between a user actively viewing a metric and a user passively viewing a metric. Project heat map module 50 may also determine key metrics based on previous cycles of the project. For example, project heat map module 50 may associate problematic metrics from past iterations of project as key metrics of the current iteration of the project. As an additional example, project heat map module 50 may determine the most-viewed metrics for past iterations of a project and use those most-viewed metrics as the key metrics for the current iteration of the project.

Because project heat map module 50 may track viewing and clicking patterns of each user interacting with the generated heat map, a myriad of information regarding management styles and viewing habits may be shared across an organization. The project heat map module 50 may track the viewing time, clicks, user preferences for thresholds, messages, and other types of interaction with the generated project heat map to generate a user viewing profile for each individual. In certain embodiments, project heat map module 50 makes this user viewing profile available for other users to view. In these situations, a junior member of an organization may view the viewing habits of a senior member of an organization. Using this information, a junior member may understand the senior member's thresholds for certain metrics and also gain an understanding of metrics that are more important to a senior member as compared to other metrics. In addition, a senior manager may view how a junior manager looks and tracks specific projects. Senior managers may then advise the junior manager on the junior manager's management style or even collect insights on potentially problematic areas of a project based on what metrics the junior manager is focusing on.

Project heat map module 50 may also incorporate an organizational chart to determine the connections between employees in an organization. Project heat map module 50 may restrict the view of a user's viewing pattern to a limited number of degree of connections from the user requesting access to the user's viewing pattern to the user associated with the user's viewing pattern. In addition, using the organizational chart, senior managers may provide information to subordinate employees through the generated project heat map. For instance, a senior manager may determine important metrics of a project, and then have project heat map module 50 adjust the view of the project heat map for the subordinate employee to highlight these important metrics. In addition, a senior manager may communicate messages and/or provide a prompt through the generated project heat map to the subordinate employee.

Project heat map module 50 may also associate a contact with a particular metric. For example, project heat map module 50 may associate a project manager associated with project manager computer system 30 as the contact for the headcount metric. With this information, a user may identify the key contact for a metric when viewing that particular metric in the generated project heat map. In addition, a user may contact the key contact for a metric. In an exemplary embodiment, a user may send a message to the key contact for a metric. Project heat map module 50 may log the message in project heat map module 50. In certain embodiments, project heat map module 50 may determine a key contact for a metric based on the number of clicks by a user on a specific metric or the viewing time a user spends on a specific metric.

A user viewing the project heat map may escalate a certain metric based on the key contact associated with the metric. As a user interacts with the metric, the user will know which project team is associated with that metric, who is the lead contact for that project team, and also how to reach the project team and/or the key contact. This may be particularly helpful when a metric has a RAG status of red. In this scenario, a manager can instantly determine who the project manager is and also communicate with the project manager directly (with that communication being logged in project heat map module 50 in certain embodiments). Project heat map module 50 may also deliver a message from a viewing user to the key contact associated with the metric. If a response from the key contact is delayed beyond a threshold, project heat map module 50 may then send the message to a team associated with the metric. Project heat map module 50 may also adaptively change the key contact of a metric based on the responsiveness of particular members of a team. Alternatively, a team member may identify a new key contact for a metric for project heat map module 50.

In certain embodiments, project heat map module 50 collects project data 42 and updated project data 44 for similar projects that are completed across different groups. For example, project heat map module 50 may collect financial spending for various departments across a corporation. Likewise, project heat map module 50 may collect project data 42 and updated project data 44 for different projects even within the same group. For instance, project heat map module 50 may collect financial spending for Group A as well as widgets produced by Group A. For these embodiments, project heat map module 50 may then generate a project heat map presenting the updated completeness, the risk status, material change flag, and the low-granularity project status for each project for each group simultaneously by using a tabular format. For example, each cell within the table may be associated with an individual metric associated with a certain group.

A component of system 10 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 10 without departing from the scope of the disclosure. For example, system 10 may include any number of user computer systems 20, project manager computer systems 30, storage modules 40, and project heat map modules 50. Any suitable logic may perform the functions of system 10 and the components within system 10.

FIG. 2 is an example project heat map 200 generated by project heat map module 50. Project heat map 200 may be generated by project heat map module 50 and displayed on user computer system 20 (e.g., in GUI 24) and/or project manager computer system 30 (e.g., in GUI 34). In the illustrated embodiment, project heat map 200 includes group indicator 202, project indicator 204, target date 206, risk status indicator 208, material change flag 210, low-granularity project status 212, project completeness 214, and project goal 216. As described above, project heat map module 50 may generate project heat map 200 for a user to quickly identify projects that may require additional attention.

Group indicator 202 contains an identification of the group associated with the project. In the illustrated embodiment, projects associated with the group identified in group indicator 202 are in the same row in the table. Project heat map module 50 may determine group indicator 202 based on information received from project data 42 or updated project data 44. Group indicator 202 may include any suitable combination of an alphanumeric entry, an image, a graphic, a computer-created identifier, and any other suitable identifier for identifying group indicator 202. In certain embodiments, project heat map module 50 analyzes the group associated with project data 42 and/or updated project data 44 and associates projects conducted by the same group together.

Project indicator 204 contains an identification of the project. In certain embodiments, an individual group may contain multiple projects. Project heat map module 50 may then associate the multiple projects for a group and organize project heat map 200 to display the multiple projects in an organized manner. For example, in the illustrated embodiment, a project associated with a group is in the same column as other projects associated with that same group. Project heat map module 50 may determine project indicator 204 from project data 42 and/or updated project data 44. In certain embodiments, project heat map module 50 analyzes the project associated with a group and associates it with similar projects associated separate groups.

Target date 206 contains an identification of a target date. In certain embodiments, target date 206 is representative of when the group will complete the project. In alternative embodiments, target date 206 is a projected date of when the group will address any issues indicated by the risk status and/or the low-granularity project status. In certain embodiments, a project manager associated with project manager computer system 40 sets target date 206. In an alternative embodiment, project heat map module 50 may automatically ascertain target date 206 by analyzing the messages stored in memory 56. Project heat map module 50 may also determine target date 206 from project data 42 and/or updated project data 44.

Risk status indicator 208 may indicate a risk status associated with a project. In certain embodiments, risk status indicator 208 corresponds and is displayed as a RAG status. Risk status indicator 208 may be displayed using any suitable combination of a graphical item, a text, an image, a changed visual appearance, or any type of indicator establishing the presence of a risk status.

Material change flag 210 may indicate a material change associated with a project. When the change in the completeness of the project is over a threshold, project heat map module 50 sets material change flag 210 for the project. The threshold may be set in a myriad of ways. In certain embodiments, a user and/or project manager may preset the threshold. Typically, a material change indicates recent activity that occurred for a project. A user and/or project manager may use the material change to identify both active projects and also dormant projects. For example, even if a project indicates that it is 95% complete (and nearing full completion), the lack of a material change will notify the user and/or project manager that the project may be stalling.

Material change flag 210 may be displayed using any suitable combination of a graphical item, a text, an image, a changed visual appearance, or any type of indicator establishing the presence of a material change and/or lack thereof. In certain embodiments, material change flag 210 may include a variety of flags. For example, material change flag 210 may display various flags to represent ranges of material changes.

Low-granularity project status 212 may indicate a low-granularity project status associated with a project. A low-granularity project status represents a summary of the status of the project. Instead of a project manager or user delving into the specific metrics of a project to determine the project's well-being, the low-granularity project status provides an indication of how the project is doing. In certain embodiments, low-granularity project status 212 may correspond to and may be displayed as a RAG status. Low-granularity project status 212 may be displayed using any suitable combination of a graphical item, a text, an image, a changed visual appearance, or any type of indicator establishing the presence of a low-granularity project status 212.

Project completeness 214 is a representation of the updated completeness of the project. Typically, project completeness 214 is represented in a number format in project heat map 200. In the illustration, project completeness 214 is represented by a percentage. Project completeness 214, however, can be displayed as the metric itself, or any suitable combination of a graphical item, a text, an image, a changed visual appearance, or any type of indicator establishing the presence of a low-granularity project status 212. For example, project completeness 214 may be represented as a bar graph, wherein the bar graph represents the certain percentage of the project completed.

Project goal 216 is a representation of the goal for the specific metric of the project. In the illustration, project goal 216 is the goal itself. Project goal 216, however, can be displayed as any suitable combination of a graphical item, a text, an image, a changed visual appearance, or any type of indicator establishing the presence of a project goal 216.

Modifications, additions, or omissions may be made to project heat map 200 without departing from the scope of the disclosure.

FIG. 3 illustrates an example method for generating project heat map 200 by project heat map module 50, according to certain embodiments of the present disclosure. The method may be implemented in any suitable combination of software, firmware, and hardware, according to particular needs. Although particular components may be identified as performing particular steps, the present disclosure contemplates any suitable components performing the steps according to particular needs.

At step 302, project heat map module 50 accesses storage module 40 for project data 42. In certain embodiments, project data 42 may include information for use by project heat map module 50 in generating a project heat map. For example, project data 42 may include information related to the one or more projects underlying project heat map 200 generated by project heat map module 50. As a more particular example, project data 42 may include information related to a metric related to a project. A metric may be any type of trackable data, status, financial information, resources, or information related to a project.

At step 304, project heat map module 50 determines a completeness of the project based on project data 42. The completeness represents how close the trackable metric is to the goal of the project. The goal of a project may be inputted by a user, such as a user associated with user computer system 20 or a project manager associated with project manager computer system 30. Typically, project heat map module 50 uses one or more metrics in project data 42 and the project goal to determine a completeness of the project. In certain embodiments, project heat map module 50 determines a goal for the project based on historical data stored from previous iterations of the project. For example, project heat map module 50 may determine an average completeness metric per a certain time period, and then extrapolate that metric over the course of a future time period.

At step 306, project heat map module 50 accesses storage module 40 for updated project data 44. Updated project data 44 comprises a metric for the project. Generally, the project in updated project data 44 is the same or a similar project to the project in project data 42. Similarly, the updated metric for the project in updated project data 44 is typically the same type of metric or a similar type of metric as the metric in project data 42.

Similar to determining a completeness of the project based on project data 42, project heat map module 50 may determine an updated completeness of the project based on updated project data 44 and the project goal at step 308. Typically, the goal of the project remains the same from project data 42 and updated project data 44. In an exemplary embodiment, the goal of the project may change from project heat map module 50 collecting project data 42 and updated project data 44. For example, a user or project manager may submit a new goal for the project.

Next, project heat map module 50 may determine a change in the completeness of the project based on the completeness of the project and the updated completeness of the project at step 310. In certain embodiments, project heat map module 50 may standardize the change in completeness to an average over a certain period of time. In exemplary embodiments, the change in the completeness of the project is weighted by the deadline. As the deadline of a project nears, project heat map module 50 may weight the change in completeness of the project differently than a project that is not nearing its deadline.

Project heat map module 50 then determines whether the change in the completeness of the project is over a threshold. When the change in the completeness of the project is over a threshold, the method proceeds to step 314. If the change in completeness of the project is not over the threshold, the method proceeds to step 316. The threshold may be set in a myriad of ways. A user and/or project manager may preset the threshold. Project heat map module 50 may adaptively determine the threshold based on statistical measurements from changes in the completeness of the project from other similar project. In certain embodiments, project heat map module 50 may determine the threshold based on previous changes in the completeness of the project during previous cycles of the project. In this embodiment, project heat map module 50 identifies an estimated change in the completeness of the project during the similar time frame, and determines a threshold from that estimated change. In exemplary embodiments, project heat map module 50 adaptively determines a threshold based on a deadline of the project.

At step 314, project heat map module 50 sets material change flag 210. In certain embodiments, material change flag 210 may include a variety of flags. For example, material change may include a range of changes such that different amounts of material change may be displayed as different symbols. For instance, if a change in completeness of 5% occurs, material change may be set as a minor material change. Using the same example, if a change in completeness of 50% occurs, material change may be set to a major material change.

At step 316, project heat map module 50 determines a historical trend associated with the project. A historical trend consists of a trend from a previous cycle or previous cycles of a project. For example, using previous tracking data of a project's completeness over the course of a past cycle, project heat map module 50 may create an expected completeness for this current cycle.

At step 318, project heat map module 50 determines a project assessment associated with the project. The project assessment associated with a project may be a value inputted by user associated with user computer systems 20 or project manager associated with project manager computer systems 30. In certain embodiments, the user or the project manager may have the option to set the project assessment based on a personal assessment of the project. In an additional embodiment, project heat map module 50 may determine a project assessment based on metrics in project data 42 and updated project data 44. For instance, project heat map module 50 may determine a project assessment based on a key metric associated with the project data. An additional embodiment includes project heat map module 50 determining a project assessment using the criteria described above and a mood associated with recent messages regarding the project as described below.

Based on the historical trend and the project assessment associated with the project, project heat map module 50 may then determine a low-granularity project status 212 for the project at step 320. The low-granularity status provides an indication of a general status of the project. In certain embodiments, the low-granularity status is indicated by colors, such as a RAG status. Project heat map module 50 may determine the low-granularity project status 212 for the project based on a deviation from the updated completion of the project and the expected completion of the project. For example, using statistical analysis, project heat map module 50 may determine that the updated completion of the current status is behind the expected project completeness. Consequently, project heat map module 50 may set a red low-granularity project status 212 for the project.

At step 322, project heat map module 50 may be operable to generate project heat map 200 for display on GUI 24 and/or GUI 34. Project heat map 200 may display project risk status 208, material change flag 210, and low-granularity project status 212, the updated completeness of the project as project completeness 214, and the goal of the project as project goal 216 simultaneously. In certain embodiments, each project and each metric contains a cell in a table in project heat map 200.

Modifications, additions, or omissions may be made to the method depicted in FIG. 3. The method may include more, fewer, or other steps. Additionally, steps may be performed in parallel or in any suitable order. While described as project heat map module 50 performing the steps, any suitable component of system 10 may perform one or more steps of the method.

Certain embodiments of the present disclosure may provide one or more technical advantages. A technical advantage of one embodiment includes providing a graphical display that allows a user to quickly assess a project's well-being. Yet another technical advantage includes instantaneously updating a generated project heat map using updated information, thus providing a user a real-time view into the project's metrics. Another technical advantage includes improving the efficiency of network resource usage by accumulating a project's metrics into one module. An additional technical advantage includes improving visibility into a company's projects by presenting the project's metrics using a graphical representation. Additionally, a technical advantage of one embodiment includes increasing transparency of various management styles and project concerns across different levels of management. Furthermore, by generating a project heat map in a centralized location, an organization may further experience efficiency in other resources, such as computing resources.

Although the present invention has been described with several embodiments, a myriad of changes, variations, alterations, transformations, and modifications may be suggested to one skilled in the art, and it is intended that the present invention encompass such changes, variations, alterations, transformations, and modifications fall within the scope of the appended claims.

What is claimed is:

1. The system, comprising:
a storage module configured to access project data related to one or more projects; and
a map module including a processor operably connected to the storage module to access the project data related to one or more projects;
wherein the processor is configured to:
access project data for a first project via the storage module and identify a metric indicative of the first project status at a particular time;
determine a completeness of the first project based on the metric;
receive updated project data for the first project and identify an updated metric indicative of the first project status following the particular time;
determine a threshold for the first project and calculate a change in the completeness of the first project based on differences between the updated metric and the metric resulting in an updated completeness of the first project;
when the change in the completeness of the first project is over the threshold, set a material change flag indicative of a change associated with the first project;
determine a low-granularity project status for the first project indicative of a status summary of the first project; and
generate a project heat map to present, via a display, the updated completeness of the first project, the material change for the first project, and the low-granularity project status simultaneously.

2. The system of claim 1, wherein:
the processor is further operable to determine a historical trend associated with the first project based on one or more previous cycles of the first project, wherein the historical trend identifies an expected completeness of the first project; and
determine the low-granularity project status for the first project based on the expected completeness of the first project and a project assessment associated with the first project.

3. The system of claim 1, wherein:
the processor is further operable to determine a risk status for the first project based on the updated completeness of the first project; and
to present, via the display, the risk status simultaneously with the updated completeness of the first project, the material change for the project, and the low-granularity project status.

4. The system of claim 3, wherein the risk status is adaptively determined based on the updated completeness of the first project and a deadline associated with the first project.

5. The system of claim 1, wherein:
the processor is further operable to:
access a message associated with the first project from a user;
determine a context of the message from the user by applying a textual analysis to the message;
present, via the display, the context of the message simultaneously with the updated completeness of the first project, the material change for the project, and the low-granularity project status.

6. The system of claim 1, wherein the processor is further operable to adaptively determine the threshold based on a deadline of the first project.

7. The system of claim 1, wherein the low-granularity project status is represented by a color displayed in the project heat map.

8. A method in a mapping module, comprising:
accessing, via a storage module, project data associated with a project, the project data comprising a metric for the project;
determining a completeness of the project based on the metric;
accessing updated project data for the project, the updated project data comprising an updated metric for the project;
determining a threshold for the project and calculating a change in the completeness of the project based on the differences between the updated metric and the metric resulting in an updated completeness of the project;

when the change in the completeness of the project is over the threshold, setting a material change flag for the project;

determining a low-granularity project status for the project based on a received project assessment associated with the project, the low-granularity project status indicating a status summary of the project; and generating a project heat map presenting the updated completeness of the project, the material change of the project, and the low-granularity project status simultaneously.

9. The method of claim 8, further comprising:

determining a historical trend associated with the project based on previous cycles of the project, wherein the historical trend identifies an expected completeness of the project; and determining the low-granularity project status for the project based on the expected completeness of the project and the project assessment associated with the project.

10. The method of claim 8, further comprising:

determining a risk status for the project based on the updated completeness of the project; and presenting the risk status for the project simultaneously with the updated completeness of the project, the material change for the project, and the low-granularity project status.

11. The method of claim 10, wherein the risk status is adaptively determined based on the updated completeness of the project and a deadline associated with the project.

12. The method of claim 8, further comprising receiving a message from a user associated with the project via a user interface;

storing the message from the user associated with the project;

determining a context of the message from the user by applying a textual analysis to the message;

communicating the message from the user to a project manager associated with the project; and presenting the context of the message simultaneously with the completeness of the project, the material change for the project, and the low-granularity project status.

13. The method of claim 12, wherein the processor is further operable to adaptively determine the threshold based on a deadline of the project.

14. The method of claim 8, wherein the low-granularity project status is represented by a color displayed in the project heat map.

15. Non-transitory computer readable medium comprising programming logic therein, the programming logic, when executed by a processor, operable to:

access project data associated with a project, via a storage module, the project data comprising a metric for the project;

determine a completeness of the project based on the metric;

access updated project data for the project, the updated project data comprising an updated metric for the project;

determine a threshold for the project and calculate a change in the completeness of the project based on a difference between the updated metric and the metric resulting in an updated completeness of the project;

when the change in the completeness of the project is over the threshold, set a material change flag for the project;

determine a low-granularity project status for the project indicating a status summary of the project; and generate a project heat map to present the updated completeness of the project, the material change flag, and the low-granularity project status simultaneously.

16. The computer readable medium of claim 15, wherein the programming logic is further operable to:

determine a historical trend associated with the project based on previous cycles of the project, wherein the historical trend identifies an expected completeness of the project; and wherein the low-granularity project status for the project is based on the expected completeness of the project and a project assessment associated with the project.

17. The computer readable medium of claim 15, wherein the programming logic is further operable to:

determine a risk status for the project based on the updated completeness of the project; and wherein the risk status is presented simultaneously with the updated completeness of the project, the material change flag, and the low-granularity project status.

18. The computer readable medium of claim 17, wherein the risk status is adaptively determined based on the updated completeness of the project and a deadline associated with the project.

19. The computer readable medium of claim 15, wherein the programming logic is further operable to:

receive a message from a user associated with the project;

store the message from the user associated with the project;

determine a context of the message from the user by applying a textual analysis to the message;

communicate the message from the user to a project manager associated with the project; and present the context of the message simultaneously with the updated completeness of the project, the material change flag, and the low-granularity project status.

20. The computer readable medium of claim 15, wherein the programming logic is further operable to adaptively determine the threshold based on a deadline of the project.

* * * * *